(12) United States Patent
Addison et al.

(10) Patent No.: US 7,086,699 B1
(45) Date of Patent: Aug. 8, 2006

(54) RECLINER ASSEMBLY FOR VEHICLE SEATS

(75) Inventors: Todd Michael Addison, Freeport, IL (US); Robert Andrew Hendren, Freeport, IL (US); Curtis James Hudson, Macomb Twp., MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 29 days.

(21) Appl. No.: 11/018,073

(22) Filed: Dec. 21, 2004

(51) Int. Cl.
*B60N 2/02* (2006.01)
(52) U.S. Cl. ...................................... 297/374; 297/362
(58) Field of Classification Search ................ 297/367, 297/374, 376, 362
See application file for complete search history.

(56) References Cited

U.S. PATENT DOCUMENTS

| | | | |
|---|---|---|---|
| 4,986,514 A | 1/1991 | Ikegaya et al. | |
| 5,634,689 A | 6/1997 | Putsch et al. | |
| 5,810,442 A | 9/1998 | Ito et al. | |
| 5,871,414 A | 2/1999 | Voss et al. | |
| 6,619,743 B1 | 9/2003 | Scholz et al. | |
| 6,637,821 B1 * | 10/2003 | Lee et al. | 297/362 |
| 6,755,470 B1 | 6/2004 | Iwata et al. | |
| 6,918,635 B1 * | 7/2005 | Finner et al. | 297/362 |

* cited by examiner

*Primary Examiner*—Anthony D. Barfield
(74) *Attorney, Agent, or Firm*—Kevin S. Mackenzie; Gifford, Krass..; Dean B. Watson

(57) ABSTRACT

A seat recliner assembly having a fixed gear plate having a gear portion formed therein. The gear portion is disposed about a first slot that includes a first raised collar. A movable plate having a gear portion formed therein and disposed about a second slot also includes a second raised collar. The gear portion of the movable plate is in operating engagement with the gear portion of the fixed plate and defines an annular race between an outer surface of the first raised collar and an inner surface of the second raised collar. A bearing member is disposed concentric to the inner surface of the second raised collar. First and second wedge members are disposed in the annular race and engage the bearing member. Each of the wedge members includes first and second contact features. A spring member engaging each of the wedge members biases the wedge members apart. A hub member is engaged with a drive shaft and projects through the first slot. A drive plate juxtaposed in relation to the movable plate is adapted to engage the hub member. The drive plate includes first and second engagement features to engage the first and second contact features of the first and second wedge members. Rotary motion of the drive plate causes engagement of the first engagement feature with the first contact feature followed by engagement of the second engagement feature with the second feature.

16 Claims, 4 Drawing Sheets

RECLINER ASSEMBLY FOR VEHICLE SEATS

BACKGROUND OF THE INVENTION

The invention relates to adjustment mechanisms for vehicle seats, and more particularly to a recliner assembly for vehicle seats.

Seat reclining mechanisms, of a Taumel design, include an inner gear partially engaged with an outer gear that has a smaller number of teeth than the inner gear. In such a design, eccentric movement of the gears generally eliminates rattling associated with circular movement of gears when the inclination of the seat back is adjusted.

Generally, Taumel type recliner assemblies include a pair of plates having the inner and outer gears described above formed thereon. The plates are positioned on top of each other such that the inner and outer gears engage each other to provide movement to a seat back relative to a seat cushion. Typically, a friction clutch type mechanism including wedge members that are releasably engaged with the inner and outer gear plates is utilized. Such a clutch mechanism locks the seat back in position when adjustment is not being performed, and then releasably moves with the plates when an adjustment operation is underway.

The friction clutch or wedge type adjustment mechanisms of the prior art have limitations including a lag in response time when reversing the direction of adjustment. There is therefore a need in the art for a recliner adjustment mechanism that has a quick response time when reversing the direction of rotation of a recliner mechanism such that a passenger of a motor vehicle does not perceive an extended lag or pause in the adjustment of a seat assembly. Additionally, such a recliner mechanism should have a low cost design and meet the packaging demands required for seat mechanisms.

SUMMARY OF THE INVENTION

A seat recliner assembly having a fixed gear plate having a gear portion formed therein. The gear portion is disposed about a first slot that includes a first raised collar. A movable plate having a gear portion formed therein and disposed about a second slot also includes a second raised collar. The gear portion of the movable plate is in operating engagement with the gear portion of the fixed plate and defines an annular race between an outer surface of the first raised collar and an inner surface of the second raised collar. A bearing member is disposed concentric to the inner surface of the second raised collar. First and second wedge members are disposed in the annular race and engage the bearing member. Each of the wedge members includes first and second contact features. A spring member engaging each of the wedge members biases the wedge members apart. A hub member is engaged with a drive shaft and projects through the first slot. A drive plate juxtaposed in relation to the movable plate is adapted to engage the hub member. The drive plate includes first and second engagement features to engage the first and second contact features of the first and second wedge members. Rotary motion of the drive plate causes engagement of the first engagement feature with the first contact feature followed by engagement of the second engagement feature with the second contact feature.

DETAILED DESCRIPTION OF THE PREFERRED EMBODIMENTS

Figure 1:
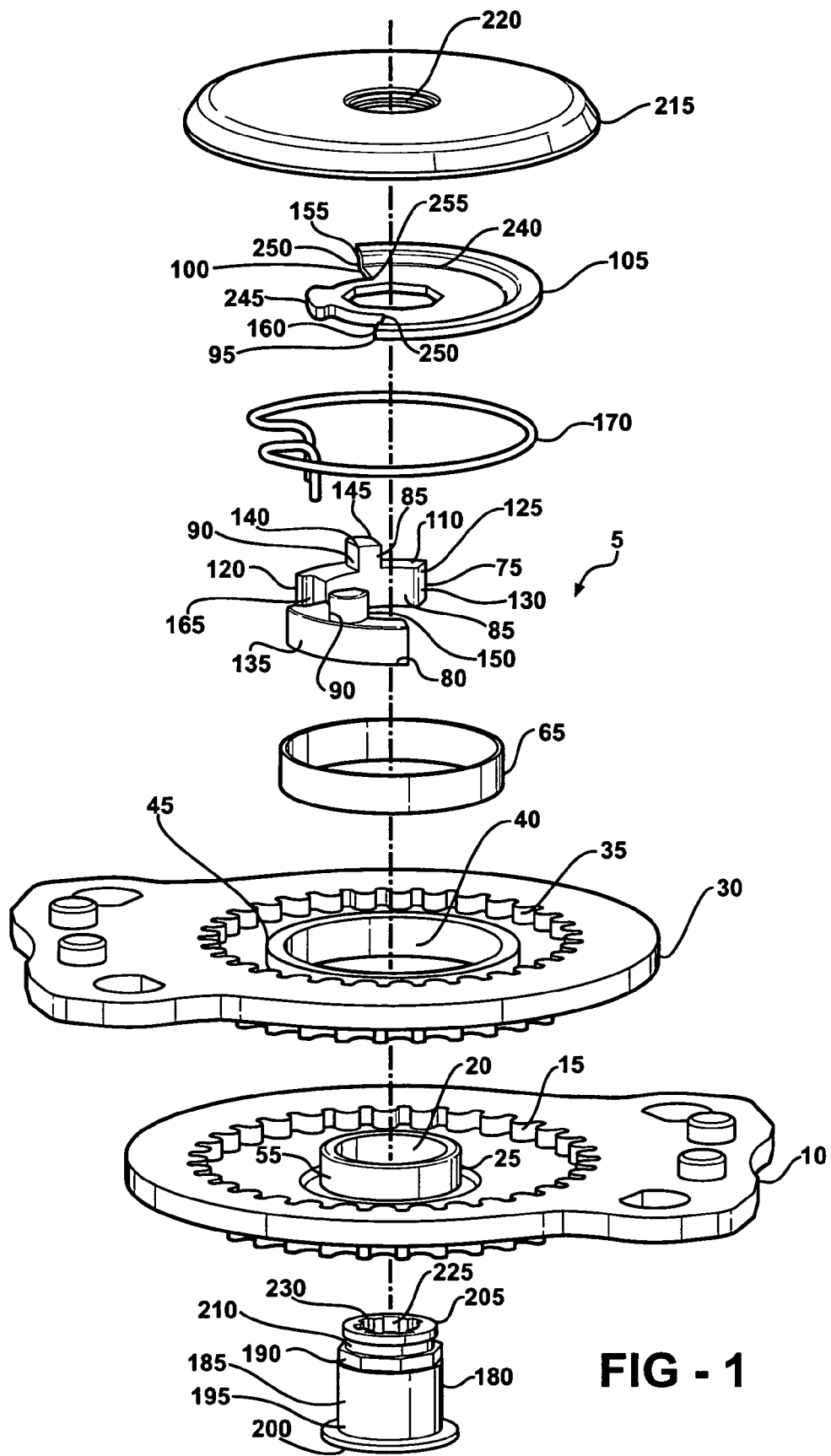
FIG. 1 is a perspective assembly view of a first embodiment of the recliner assembly of the present invention.

Referring to FIG. 1, there is shown a perspective assembly view of a first embodiment of the recliner assembly 5 of the present invention. The recliner assembly 5 includes a fixed gear plate 10 having a gear portion 15 formed therein. The gear portion 15 may be stamped or otherwise formed in the gear plate 10, as is commonly known in the art. The gear portion 15 is disposed about a first slot 20 having a first raised collar 25. A movable plate 30 having a gear portion 35 formed therein is also disposed about a second slot 40 having a second raised collar 45. The gear portion 35 of the movable plate 30 is in operating engagement with the gear portion 15 of the fixed plate 10. An annular race 50 is defined between an outer surface 55 of the first raised collar 25 and an inner surface 60 of the second raised collar 45. In a preferred aspect of the present invention, the gear portion 35 of the movable plate 30 has one less gear tooth formed thereon in comparison to the gear portion 15 of the fixed gear plate 10. Such an arrangement is commonly known in the art and allows for eccentric movement of the movable gear plate 30 in relation to the fixed gear plate 10.

A bearing member 65 is disposed concentric to the inner surface 60 of the second raised collar 45. The bearing member 65 provides a contact surface to transfer rotary motion from a hub member 180, as will be discussed in more detail below.

First and second wedge members 75, 80 are disposed within the annular race 50 and engage the bearing member 65. Each of the first and second wedge members 75, 80 includes first and second contact features 85, 90 for engaging engagement features 95, 100 formed on a drive plate 105, again as will be discussed in more detail below. The wedge members 75, 80 are arcuate block members having top 110, bottom 115, front 120, rear 125, inner 130 and outer 135 surfaces. In the first embodiment, the first and second contact features 85, 90 of the wedge members 75, 80 are tabs 140 that extend from the top surfaces 110 of the wedge members 75, 80. The tabs 140 preferably include opposing first and second contact surfaces 145, 150 that engage engagement surfaces 155, 160 of the drive plate 105 as will be discussed in more detail below. The front surfaces 120 of the wedge members 75, 80 include location features 165 formed thereon for retaining a spring member 170. The spring member 170 engages each of the wedge members 75, 80 and biases them apart; thereby, providing a clutch function that maintains the movable plate 30 and fixed plate 10 in a stationary position when actuation of a seat recliner assembly is not taking place.

A hub member 180 is engaged with a drive shaft (not shown) and projects through the first slot 20 of the fixed gear plate 10. The hub member 180 is a generally cylindrical body 185 that includes an engagement portion 190 for mating with the drive plate 105. At a proximal end 195 of the cylindrical body 185 there is a flange 200 formed thereon for maintaining the hub member 180 in position relative to the fixed gear plate 10. At a distal end 205 of the cylindrical body 185, a location slot 210 is formed thereon for engaging a retention cover 215. Preferably the retention cover 215 includes a slot or bore 220 sized to snap fit into the location slot 210 formed on the hub member 180. In a preferred aspect, an inner portion 225 of the cylindrical body 185 of the hub member 180 includes a spline 230 for engaging a corresponding feature formed on the drive shaft.

The drive plate 105 is juxtaposed in relation to the movable plate 30 and is adapted to engage the hub member 180, as described above. The drive plate 105 includes first and second engagement features 95, 100 for engaging the first and second contact features 85, 90 of the first and second wedge members 75, 80. Rotary motion of the drive plate 105 causes engagement of the first engagement feature 95 with the first contact feature 85 followed by engagement of the second engagement feature 100 with the second contact feature 90 for releasing and moving the movable plate 30 relative to the fixed plate 10. In a preferred aspect of the present invention, clockwise rotation of the drive plate 105 causes the first engagement feature 95 to engage the first contact feature 85 of the first wedge 75 and the second engagement feature 100 to engage the second contact feature 90 of the second wedge 80. Counter-clockwise rotation of the drive plate 105 causes the first engagement feature 95 to engage the first contact feature 85 of the second wedge 80 and the second engagement feature 100 to engage the second contact feature 90 of the first wedge 75.

Figure 2:
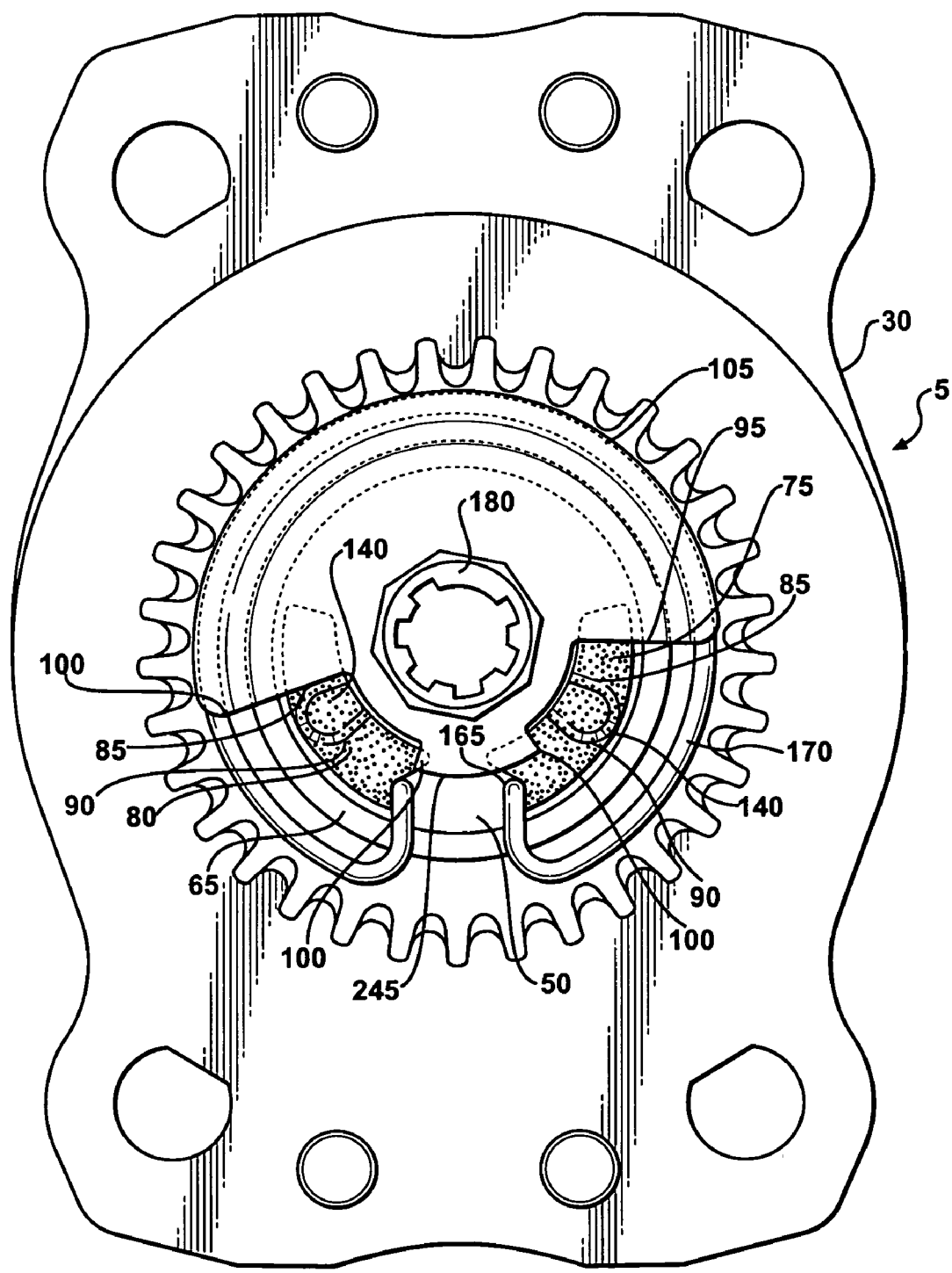
FIG. 2 is a top view of the first embodiment of the recliner assembly showing engagement of the drive plate with the wedge members.

Referring to the first embodiment depicted in FIGS. 1 and 2, the first and second contact features 85, 90 of the wedge members 75, 80 are tabs 140 extending from the top surfaces 110 of the wedge members 75, 80. The tabs 140 include opposing first and second contact surfaces 145, 150 that engage the drive plate 105. The drive plate 105 of the first embodiment is in the form of a truncated disk 240 having a radially projecting extension 245. The radially projecting extension 245 is positioned between the first and second wedge members 75, 80 for engaging the second contact features 90 of the first and second wedge members 75, 80. The drive plate 105 of the first embodiment also includes flanged portions 250 formed thereon that are defined by an inward radial cut 255 extending toward a center of the truncated disk 240. The flanged portions 250 define the first engagement features 95, 100 of the drive plate 105 of the first embodiment. The flanged portions 250 engage the first contact features 85 of the first and second wedge members 75, 80.

Figure 3:
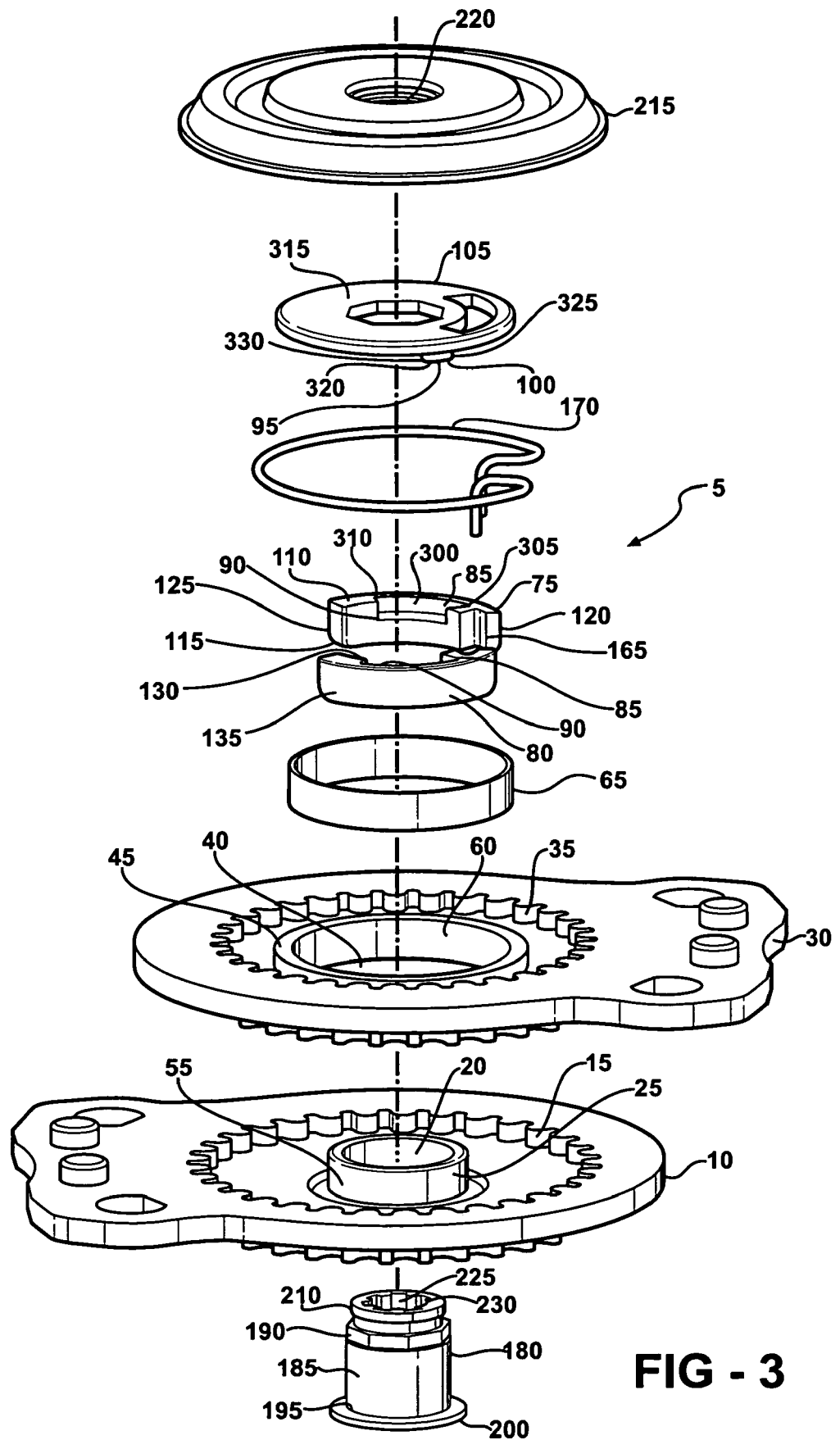
FIG. 3 is a perspective assembly view of a second embodiment of the recliner assembly of the present invention.
Figure 4:
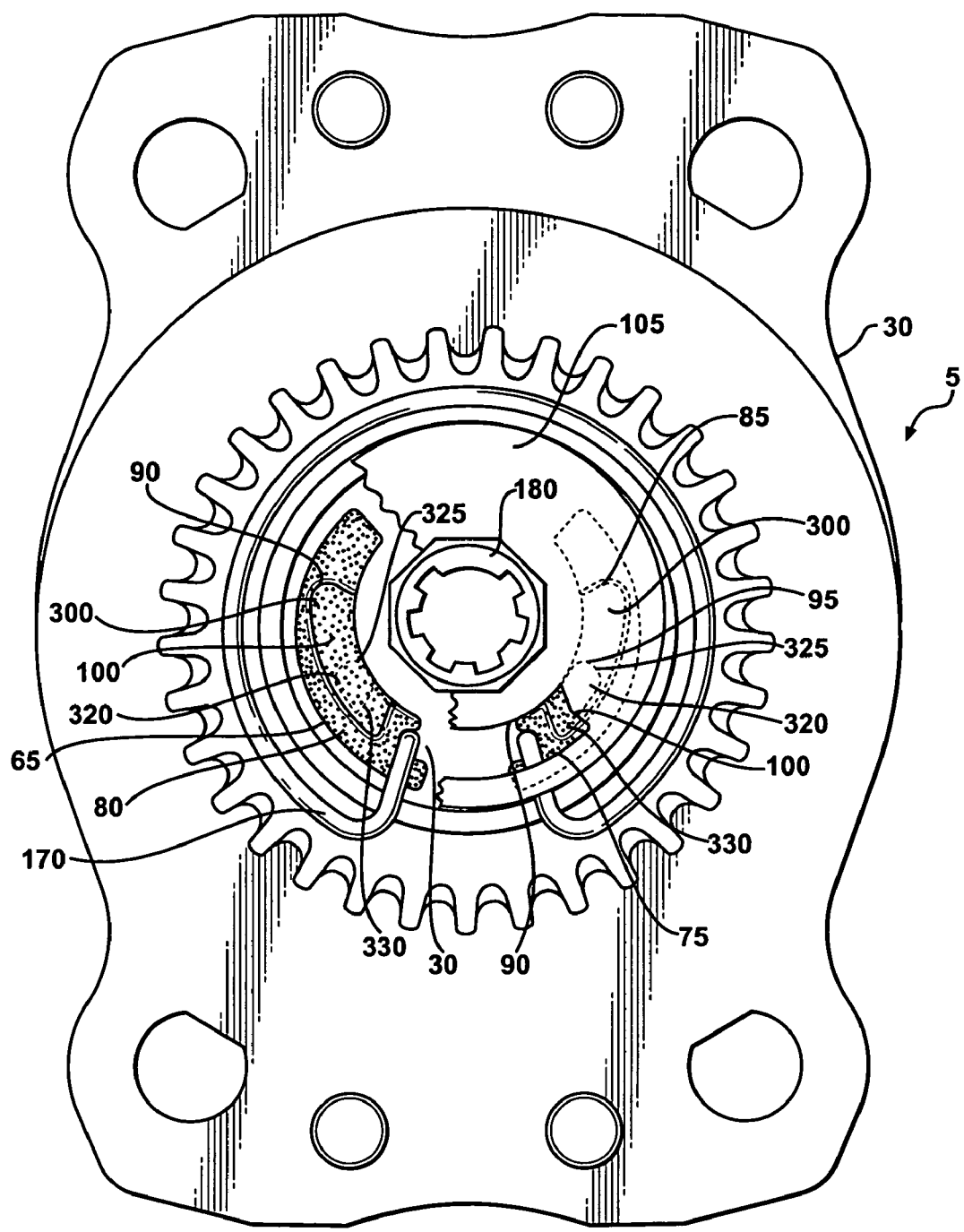
FIG. 4 is a top view of the second embodiment showing engagement of the drive plate with the wedge members.

In the second embodiment of the seat recliner depicted in FIGS. 3 and 4, the first and second contact features 85, 90 are channels 300 formed in the top surfaces 110 of the wedge members 75, 80. Channels 300 include third and fourth contact surfaces 305, 310, again for mating with the drive plate 105. The drive plate 105 of the second embodiment is a disk 315 having a pair of radially spaced downwardly projecting tabs 320 formed thereon. Each of the radially spaced downwardly projecting tabs 320 includes opposing third and fourth engagement surfaces 325, 330 for corresponding engagement with the third and fourth contact surfaces 305, 310, respectively. The radially spaced downwardly projecting tabs 320 are received in the channels 300 formed in the top surface 110 of the first and second wedge members 75, 80 for movement therein.

In use, the movable and fixed plates 30, 10 are positioned such that the gear portions 35, 15 are operably engaged with one another. The wedge members 75, 80 and bearing member 65 are disposed in the annular race 50 with the spring member 170 biasing the wedge members 75, 80 apart thereby locking the movable plate 30 relative to the fixed plate 10. The hub member 180 projects through the first and second slots 20, 40 formed in the fixed 10 and movable 30 plates and operably engages the drive plate 105 that is positioned in juxtaposition relative to the movable plate 30. The retention cover 215 is securely retained in the location slot 210 formed in the hub member 180. As the hub member 180 is rotated, the drive plate 105 correspondingly rotates with the hub member 180. The first and second engagement features 95, 100 of the drive plate 105 contact the first and second contact features 85, 90 of the wedge members 75, 80 to release and then move the movable plate 30 relative to the fixed plate 10. With reference to the second embodiment, the drive plate 105 includes the downwardly projecting tabs 320 outlined above that travel within the channels 300 formed in the wedge members 75, 80. Rotation of the drive plate 105 in a clockwise direction causes the third engagement surface 325 of the tab 320 to operably engage the third contact surface 305 of the channel 300 formed in the first wedge member 75. This contact causes the first wedge member 75 to become disengaged from the bearing member 65 against the biasing force of the spring member 170. Continued rotation of the drive plate 105 causes engagement of the fourth engagement surface 330 with the fourth contact surface 310; thereby releasing the second wedge member 80 from the bearing member 65 against the biasing force of the spring member 170. At this point, the movable plate 30 is free to rotate with respect to the fixed plate 10 allowing adjustment of a seat back relative to a seat cushion.

With reference to the first embodiment, clockwise rotation of the drive plate 105 causes the first engagement surface 155 to operably engage the first wedge member 75 thereby releasing the first wedge member 75 from the bearing member 65, as described above. Continued rotation of the drive plate 105 causes the second engagement surface 160 formed on the radially projecting extension 245 to contact the second contact surface 150 of the second wedge member 80 releasing the second wedge member 80 from the bearing member 65. Again, after release of the second wedge member 80, the movable plate 30 is free to rotate with respect to the fixed plate 10.

The first and second embodiments both include drive plates 105 having first and second engagement features 95, 100 that contact first and second contact features 85, 90 on the first and second wedge members 75, 80. As disclosed above, the first contact feature 85 engages the first engagement feature 95 followed in succession by engagement of the second engagement feature 100 with the second contact feature 90. In this manner, the drive plate 105 and wedge members 75, 80 form a lost motion arrangement that allows for quick transitions between clockwise and counterclockwise rotation of the drive plate 105.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A seat recliner assembly comprising:
   a fixed gear plate having a gear portion formed therein and disposed about a first slot having a first raised collar;

a moveable plate having a gear portion formed therein and disposed about a second slot having a second raised collar, the gear portion of the moveable plate in operating engagement with the gear portion of the fixed plate thereby defining an annular race between an outer surface of the first raised collar and an inner surface of the second raised collar;

a bearing member disposed concentric to the inner surface of the second raised collar;

first and second wedge members disposed in the annular race and engaging the bearing member, each of the wedge members including first and second contact features;

a spring member engaging each of the wedge members for biasing the wedge members apart;

a hub member engaged with a drive shaft and projecting through the first slot;

a drive plate juxtaposed in relation to the moveable plate and adapted to engage the hub member, the drive plate including first and second engagement features for engaging the first and second contact features of the first and second wedge members wherein rotary motion of the drive plate causes engagement of the first engagement feature with the first contact feature followed by engagement of the second engagement feature with the second contact feature for releasing and moving the moveable plate relative to the fixed plate.

2. The seat recliner assembly of claim 1 wherein clockwise rotation of the drive plate causes the first engagement feature to engage the first contact feature of the first wedge and the second engagement feature to engage the second contact feature of the second wedge.

3. The seat recliner assembly of claim 1 wherein counterclockwise rotation of the drive plate causes the first engagement feature to engage the first contact feature of the second wedge and the second engagement feature to engage the second contact feature of the first wedge.

4. The seat recliner assembly of claim 1 wherein the wedge members comprise arcuate block members having top, bottom, front, rear, inner and outer surfaces.

5. The seat recliner assembly of claim 4 wherein the first and second contact features of the wedge members comprises tabs extending from the top surfaces of the wedge members, the tabs including opposing first and second contact surfaces.

6. The seat recliner assembly of claim 4 wherein the front surfaces of the wedge members include location features formed thereon for retaining the spring member.

7. The seat recliner assembly of claim 4 wherein the contact features comprise channels formed in the top surfaces of the wedge members, the channels including third and fourth contact surfaces.

8. The seat recliner assembly of claim 1 wherein the drive plate comprises a truncated disk having a radially projecting extension.

9. The seat recliner assembly of claim 8 wherein the radially projecting extension is positioned between the first and second wedge members for engaging the second contact features of the first and second wedge members.

10. The seat recliner assembly of claim 1 wherein the drive plate includes flanged portions formed thereon, the flanged portions defined by an inward radial cut extending toward a center of the truncated disk.

11. The seat recliner assembly of claim 10 wherein the flanged portions define the first engagement features and operably engage the first contact features of the first and second wedge members.

12. The seat recliner assembly of claim 1 wherein the drive plate comprises a disk having a pair of radially spaced downwardly projecting tabs formed thereon.

13. The seat recliner assembly of claim 12 wherein each radially spaced downwardly projecting tab includes opposing third and fourth engagement surfaces.

14. The seat recliner assembly of claim 10 wherein the radially spaced downwardly projecting tabs are received in channels formed in top surfaces of the first and second wedge members, the channels including third and fourth contact surfaces.

15. The seat recliner assembly of claim 14 wherein the third engagement surface operably engages the first contact surface and the fourth engagement surface operably engages the fourth contact surface.

16. A seat recliner assembly comprising:
a fixed gear plate having a gear portion formed therein;
a moveable plate having a gear portion formed therein, the gear portion of the moveable plate in operating engagement with the gear portion of the fixed plate;
first and second wedge members disposed between the fixed gear plate and the moveable gear plate, each of the wedge members including first and second contact features;
a hub member engaged with a drive shaft;
a drive plate juxtaposed in relation to the moveable plate and adapted to engage the hub member, the drive plate including first and second engagement features for engaging the first and second contact features of the first and second wedge members wherein rotary motion of the drive plate causes engagement of the first engagement feature with the first contact feature followed by engagement of the second engagement feature with the second contact feature for releasing and moving the moveable plate relative to the fixed plate.

* * * * *